(12) United States Patent
Moon et al.

(10) Patent No.: US 9,242,228 B2
(45) Date of Patent: Jan. 26, 2016

(54) PROCESS FOR PREPARING NICKEL BASED CATALYSTS FOR SCR OF NATURAL GAS

(71) Applicant: KOREA INSTITUTE OF SCIENCE AND TECHNOLOGY, Seoul (KR)

(72) Inventors: Dong Ju Moon, Seoul (KR); Jae Sun Jung, Seoul (KR); Eun Hyeok Yang, Seoul (KR); Sang Woo Kim, Seoul (KR); Jae Suk Lee, Jeollanam-do (KR); Bang Hee Kim, Seoul (KR); Jong Tae Jung, Seoul (KR); Hyun Jin Kim, Seoul (KR); Ga Ram Choi, Chungcheongnam-do (KR); Byoung Sung Ahn, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 87 days.

(21) Appl. No.: 14/265,989

(22) Filed: Apr. 30, 2014

(65) Prior Publication Data

US 2014/0349836 A1 Nov. 27, 2014

(30) Foreign Application Priority Data

May 22, 2013 (KR) .................. 10-2013-0057995

(51) Int. Cl.
*B01J 23/58* (2006.01)
*B01J 23/755* (2006.01)
*B01J 37/08* (2006.01)
*B01J 21/04* (2006.01)
*B01J 23/83* (2006.01)
*B01J 35/00* (2006.01)
*B01J 35/08* (2006.01)
*B01J 35/10* (2006.01)
*B01J 37/02* (2006.01)
*C01B 3/04* (2006.01)

(52) U.S. Cl.
CPC ................ *B01J 23/755* (2013.01); *B01J 21/04* (2013.01); *B01J 23/83* (2013.01); *B01J 35/002* (2013.01); *B01J 35/08* (2013.01); *B01J 35/1019* (2013.01); *B01J 35/1038* (2013.01); *B01J 35/1061* (2013.01); *B01J 37/0207* (2013.01); *B01J 37/08* (2013.01); *C01B 3/04* (2013.01); *C01B 2203/0233* (2013.01); *C01B 2203/0238* (2013.01); *C01B 2203/1058* (2013.01); *C01B 2203/1082* (2013.01)

(58) Field of Classification Search
CPC .......... B01J 23/755; B01J 21/04; B01J 23/83; B01J 35/002; B01J 35/08; B01J 35/1019; B01J 35/1038; B01J 35/1061; B01J 37/0207; B01J 37/08; C01B 3/40
USPC ................ 502/330; 518/700; 423/437.1, 546; 568/579; 585/899
See application file for complete search history.

(56) References Cited

U.S. PATENT DOCUMENTS

2011/0230572 A1* 9/2011 Allison .................. B01J 21/005
568/700

FOREIGN PATENT DOCUMENTS

KR 10-0991263 B1 10/2010

*Primary Examiner* — Colleen Dunn
*Assistant Examiner* — Haytham Soliman
(74) *Attorney, Agent, or Firm* — Ladas & Parry LLP

(57) ABSTRACT

The present invention relates to a method for preparing a nickel-based catalyst for steam carbon dioxide reforming (SCR) of natural gas using steam and carbon dioxide, more particularly to a method for preparing a nickel-based catalyst represented by Ni/η-Al$_2$O$_3$, which is prepared by supporting nickel on a spherical η-alumina support having many acid sites at high density by repeating impregnation and drying tens of times.
The catalyst prepared according to the present invention exhibits superior catalytic activity when used in steam carbon dioxide reforming reaction (SCR) even under harsh conditions of high temperature and high pressure and hardly exhibits carbon deposition due to superior durability.

8 Claims, 8 Drawing Sheets

PROCESS FOR PREPARING NICKEL BASED CATALYSTS FOR SCR OF NATURAL GAS

CROSS-REFERENCE TO RELATED APPLICATIONS

This application claims priority under 35 U.S.C. §119 to Korean Patent Application No. 10-2013-0057995, filed on May 22, 2013, in the Korean Intellectual Property Office, the disclosure of which is incorporated herein by reference in its entirety.

BACKGROUND (a) Technical Field

The present invention relates to a method for preparing a nickel-based catalyst for steam carbon dioxide reforming of natural gas using steam and carbon dioxide.

(b) Background Art

With the recent increase in oil price, there has been a growing interest in alternative energy. In particular, preparation of synthetic fuels using natural gas buried in stranded gas fields is becoming more important as a new energy source. The reforming reaction for preparing synthesis gas from natural gas is achieved by reforming of methane, which is the main component of natural gas.

The reforming reactions for preparing synthesis gas from natural gas can be classified into steam reforming (SR), partial oxidation (POX), autothermal reforming (ATR), carbon dioxide reforming (CDR), steam carbon dioxide reforming (SCR), tri-reforming (TriR) or the like.

①Steam reforming (SR): $CH_4+H_2O \rightarrow 3H_2+CO$
②Partial oxidation (POX): $CH_4+0.5O_2 \rightarrow 2H_2+CO$
③Autothermal reforming (ATR): $CH_4+0.5O_2+H_2O \rightarrow 3H_2+CO_2$
④Carbon dioxide reforming (CDR): $CH_4+CO_2 \rightarrow 2H_2+2CO$
⑤Steam carbon dioxide reforming (SCR): $2CH_4+H_2O+CO_2 \rightarrow 5H_2+3CO$
⑥Tri-reforming (TriR): $3CH_4+H_2O+0.5O_2+CO_2 \rightarrow 7H_2+4CO$ At present, various methods have been attempted for preparing synthesis having variously controlled $H_2/CO$ molar ratios through reforming of methane. Among them, CDR using steam and carbon dioxide is drawing much attention.

As a catalyst for SCR, a nickel-based catalyst wherein nickel (Ni) is supported as an active component on a Ce/Mg—Al or Ce—Zr/Mg—Al support is commonly used [Korean Patent Registration No. 991,263]. The catalyst disclosed in Korean Patent Registration No. 991,263 is for use under a low-pressure condition around the atmospheric pressure and is known to exhibit very low catalytic activity at high pressures of 20 bar or above.

Thus, the inventors of the present invention have made efforts to develop an improved method for preparing a nickel-based catalyst which exhibits superior catalytic durability when used in steam carbon dioxide reforming (SCR) conducted under harsh conditions of high temperature and high pressure.

SUMMARY

The present invention is directed to providing a novel method for preparing a nickel-based catalyst having enhanced durability since a nickel (Ni) active component is supported on a spherical η-alumina support as closely bound thereto and exhibiting superior catalytic activity for a long time when used for steam carbon dioxide reforming (SCR) of natural gas using steam and carbon dioxide under high-temperature and high-pressure conditions without carbon deposition.

In an aspect, the present invention provides a method for preparing a nickel-based catalyst for steam carbon dioxide reforming (SCR), including:

i) preparing an alumina sol by adding an organic binder and a dispersing agent to an aluminum precursor solution and stirring at 50-90° C. at pH 3-6 and then converting the alumina sol to an alumina gel by heating at 50-90° C.;

ii) preparing an η-alumina support by drying the alumina gel at 150-230° C., shaping into a spherical shape and sintering under nitrogen flow; and iii) preparing a nickel-based catalyst represented by Ni/η-alumina by supporting nickel on the η-alumina support by repeating a procedure of impregnating the η-alumina support in a nickel precursor solution and drying at 50-100° C. 10-20 times and then sintering under air flow.

Other features and aspects of the present invention will be apparent from the following detailed description, drawings and claims.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the invention, and wherein.

Figure 1:
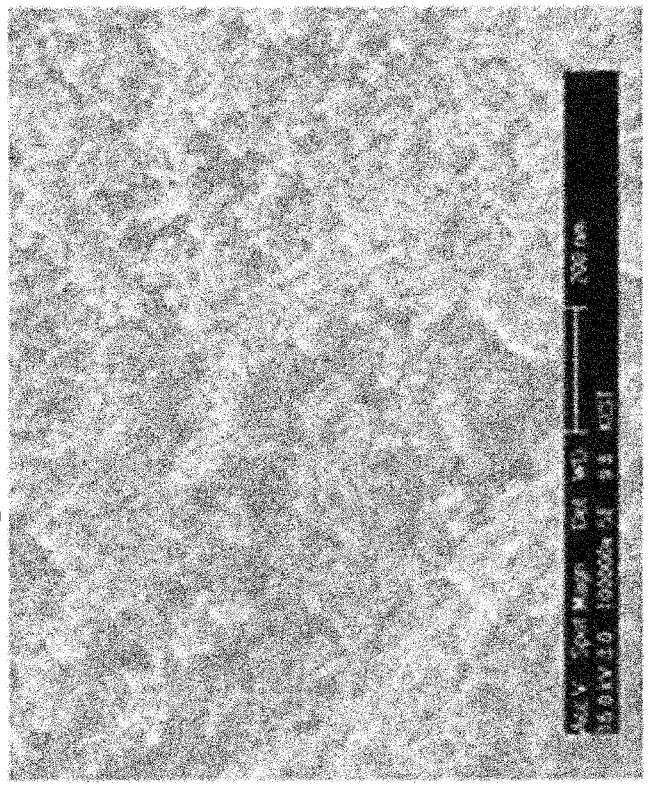
FIG. 1 compares scanning electron microscopic (SEM) images of the surface of alumina supports prepared by sintering under nitrogen flow (Preparation Example 1) or sintering under air flow (Comparative Preparation Example 1)
Figure 1:
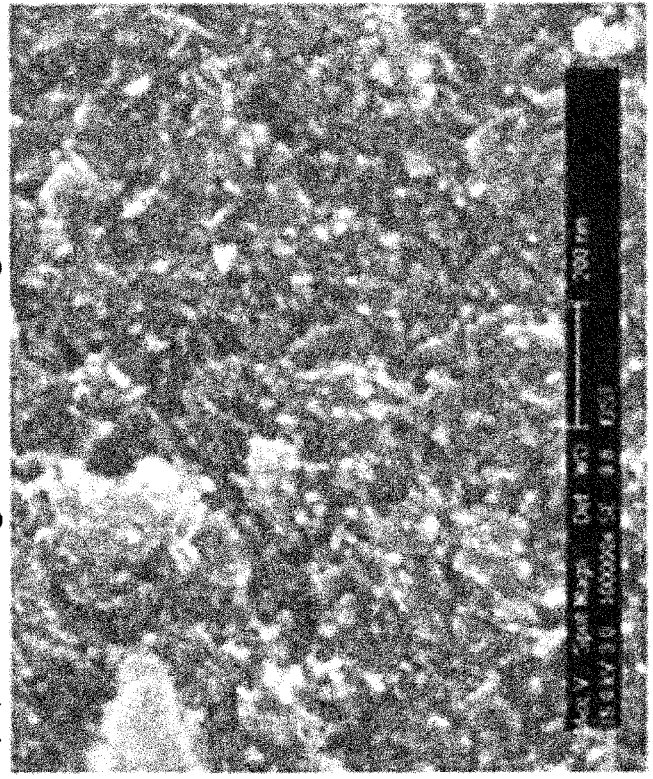

It should be understood that the appended drawings are not necessarily to scale, presenting a somewhat simplified representation of various preferred features illustrative of the basic principles of the invention. The specific design features of the invention as disclosed herein, including, for example, specific dimensions, orientations, locations and shapes, will be determined in part by the particular intended application and use environment.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention relates to a method for preparing a nickel-based catalyst for steam carbon dioxide reforming (SCR) wherein a nickel active component is supported on an η-alumina support.

Since steam carbon dioxide reforming (SCR) is usually conducted under harsh conditions of high temperature and high pressure, a catalyst for SCR requires superior durability. In the present invention, η-alumina having superior mechanical strength is prepared as a support and is prepared into a sphere shape which is resistant to pressure drop in order to enhance the durability of the catalyst.

Alumina ($Al_2O_3$) is well known as a catalyst support. Alumina can exist in various crystal phases including α-, β-, γ- and η-phases according to the preparation method. Each crystal phase is known to exhibit unique physical properties. Accordingly, although alumina is commonly used as a support, it is of great importance to select one with a suitable crystal structure according to the reaction system employed.

In the present invention, η-alumina having many acid sites is used as a support for preparing a nickel-based catalyst having superior durability. η-Alumina is known to have more acid sites than alumina of other crystal phases [*J. Catalysis*, 1963, 2, 485-497]. A nickel-based catalyst prepared using a support having many acid sites may exhibit enhanced catalytic activity for steam carbon dioxide reforming because dispersibility in the support is increased due to increased reducibility of nickel. In particular, η-alumina prepared by further adding a cerium (Ce) precursor, a lanthanum (La) precursor or a mixture thereof in addition to an aluminum precursor may exhibit further enhanced catalytic durability when used as a support for a nickel catalyst.

Also, in the present invention, the η-alumina support is shaped into a spherical shape. A catalyst support may be shaped into shapes of sphere, pellet, ring, star, etc., and the physical properties and stability of the catalyst are greatly affected thereby. In the present invention, η-alumina shaped into a spherical shape is used as a support in consideration of the strength, stability, etc. of the catalyst.

Also, in the present invention, nickel is supported on the η-alumina support by repeating a procedure of impregnating the η-alumina support in a nickel precursor solution and drying tens of times. As a result, nickel is deeply and uniformly dispersed in the pores of the support and forms firm binding with the alumina. An improved catalytic durability can be achieved through the firm binding between the nickel active component and the alumina support.

A method for preparing a nickel-based catalyst for steam carbon dioxide reforming according to the present invention will be described in detail as follows.

In the first step, an alumina gel is prepared using an aluminum precursor.

Specifically, an alumina sol is prepared by adding an organic binder and a dispersing agent to an aluminum precursor solution and stirring at 50-90° C. at pH 3-6 and then the alumina sol is converted to an alumina gel by heating at 50-90° C. In an exemplary embodiment of the present invention, an alumina sol may be prepared by further adding a cerium (Se) precursor, a lanthanum (La) precursor or a mixture thereof in addition to the aluminum precursor and then the alumina sol may be converted to an alumina gel. The cerium (Se) precursor, the lanthanum (La) precursor or the mixture thereof further added in addition to the aluminum precursor may be included in an amount of 5-15 wt % based on the weight of the aluminum precursor.

The aluminum precursor, the cerium precursor and the lanthanum precursor used in the present invention for preparation of the support may be the compounds commonly used in the preparation of catalysts and is not particularly limited in the present invention. For example, the aluminum precursor may be one or more selected from aluminum nitrate, aluminum iodide, aluminum bromide, aluminum chloride, aluminum acetate, etc. The cerium precursor may be, for example, one or more selected from cerium nitrate, cerium iodide, cerium bromide, cerium chloride, cerium acetate, etc. In particular, the lanthanum precursor may be, for example, one or more selected from lanthanum nitrate, lanthanum iodide, lanthanum bromide, lanthanum chloride, lanthanum acetate, etc.

During the alumina sol-gel transition process, a mesoporous support having mesopores can be prepared by inducing, for example, pore generation using the organic binder and the dispersing agent. The organic binder may be selected from a group consisting of polyvinyl alcohol (PVA), polyvinylpyrrolidone (PVP), polyvinylidene fluoride (PVDF), etc. The dispersing agent may be selected from a group consisting of urea, melamine and polyisocyanate. The organic binder and the dispersing agent may be respectively used in an amount of 0.01-5 wt % based on the weight of the aluminum precursor.

In the second step, an η-alumina support is prepared by drying, shaping and sintering the alumina gel.

Specifically, the alumina gel prepared in the first step is filtered, washed and then dried at 150-230° C. for about 3-10 hours. The dried alumina gel is shaped into a spherical shape using a suitable shaping apparatus. Then, after removing air from the spherically shaped alumina gel while maintaining a vacuum state, an η-alumina support is prepared by sintering the alumina gel under nitrogen atmosphere. The condition of sintering the alumina gel is very important because the crystal structure of the support varies a lot depending on the sintering condition. In order to prepare an η-alumina support desired by the present invention, the sintering is performed under nitrogen flow. Referring to the preparation examples and comparative preparation examples described below, it can be seen that the crystal phase and surface characteristics of the prepared support vary depending on the alumina gel sintering condition. In addition, in the present invention, temperature gradient is designed such that more η-alumina can be produced during the sintering under nitrogen flow. That is to say, in an exemplary embodiment of the present invention, the sintering of the alumina gel to prepare the η-alumina support is performed by heating the alumina gel under nitrogen flow at 120° C. for 1-5 hours, heating while raising temperature at a rate of 3-10° C./min from 120° C. to 500° C. and then heating at 500° C. for 1-5 hours.

In the third step, a N/η-alumina is prepared by supporting a nickel active component on the η-alumina support.

Specifically, Ni/η-alumina powder is prepared by supporting nickel on the η-alumina support prepared in the second step by repeating a procedure of impregnating the η-alumina support in a nickel precursor solution and drying at 50-100° C. 10-20 times and then sintering under air flow. In other words, in the present invention, the procedure of impregnating and drying is repeated 10-20 times, such that the nickel active component is supported on the support with high density. The volume ratio of the nickel precursor solution to the pore volume of the η-alumina support may be 1:0.5-1.0. When the volume of the nickel precursor solution is smaller, the precursor may be impregnated densely. In contrast, when the volume of the nickel precursor solution is larger, the impregnation of the precursor may not be achieved effectively. Referring to the preparation examples and comparative preparation examples described below, it can be seen that the activity of the catalyst varies greatly vary depending on the method of supporting the nickel active component.

After the nickel active component is supported, Ni/η-alumina is prepared by sintering the η-alumina support under air flow at 500-900° C. for 5-10 hours. The supporting amount of nickel may be 0.1-30 wt % based on the weight of the η-alumina support. The nickel precursor used for supporting nickel may be a compound commonly used for preparation of catalysts and is not particularly limited in the present invention. For example, the nickel precursor may be one or more selected from nickel nitrate, nickel iodide, nickel bromide, nickel chloride, nickel acetate, etc.

EXAMPLES

The present invention will be described in more detail through preparation examples and examples. The following preparation examples and examples are for illustrative purposes only and it will be apparent to those skilled in the art not that the scope of this invention is not limited by the preparation examples and examples.

Preparation Examples

Preparation of Alumina Support

Preparation Example 1

Alumina Support (Sintering Under Nitrogen Flow)

An aluminum precursor solution was prepared by adding aluminum nitrate ($Al(NO_3)_3.9H_2O$, 60 g) to ethanol (60 mL) and stirring at room temperature for about 3 hours. Separately from this, polyvinyl alcohol (6 g) was dissolved in ethanol (6 mL) and urea (6 g) was dissolved in ethanol (6 mL). The two solutions were mixed with the aluminum precursor solution and an alumina sol was obtained by stirring at 80° C. for about 24 hours at pH 5. The alumina sol was converted to an alumina gel by further heating at 80° C. for about 24 hours. The alumina gel was filtered, washed, dried at 200° C. for about 6 hours and then shaped into a spherical shape. A quartz sinterer was used for the sintering and moisture and air were discharged from the sinterer using a vacuum pump. After adding the spherical alumina gel to the quartz sinterer, ambient pressure was maintained while flowing nitrogen gas at a flow rate of 200 mL/min using a mass flow controller (MFC). The temperature of the sinterer was raised from room temperature to 120° C. at a rate of 5° C./min and then maintained at 120° C. for 3 hours. Subsequently, after raising temperature from 120° C. to 500° C. at a rate of 5° C./min while flowing nitrogen gas at a flow rate of 100 mL/min, sintering was performed at 500° C. for 12 hours. XRD analysis revealed that η-alumina was prepared.

Preparation Example 2

Ceria-alumina Support (Sintering Under Nitrogen Flow)

An alumina gel was prepared in the same manner as in Preparation Example 1, except for including 10 wt % of a cerium precursor ($Ce(NO_3)_3.6H_2O$) based on the weight of the aluminum precursor in the aluminum precursor solution. Then, a ceria-alumina support containing 10 wt % of cerium (Ce) was prepared in the same manner as in Preparation Example 1.

Preparation Example 3

Lanthana-alumina Support (Sintering Under Nitrogen Flow)

An alumina gel was prepared in the same manner as in Preparation Example 1, except for including 10 wt % of a lanthanum precursor ($La(NO_3)_3.6H_2O$) based on the weight of the aluminum precursor in the aluminum precursor solution. Then, a lanthana-alumina support containing 10 wt % of lanthanum (La) was prepared in the same manner as in Preparation Example 1.

Comparative Preparation Example 1

Alumina Support (Sintering Under Air Flow)

An alumina gel was prepared in the same manner as in Preparation Example 1. The alumina gel was filtered, washed, dried at 200° C. for about 6 hours and then shaped into a spherical shape. A quartz sinterer was used for the sintering and moisture and air were discharged from the sinterer using a vacuum pump. After adding the spherical alumina gel to the quartz sinterer, ambient pressure was maintained while introducing air at a flow rate of 200 mL/min using a mass flow controller (MFC). The temperature of the sinterer was raised from room temperature to 120° C. at a rate of 5° C./min and then maintained at 120° C. for 3 hours. Subsequently, after raising temperature from 120° C. to 500° C. at a rate of 5° C./min while introducing air at a flow rate of 100 mL/min, sintering was performed at 500° C. for 12 hours. XRD analysis revealed that a small amount of η-alumina included in γ-alumina. Hereinafter, the alumina support prepared by sintering under air flow will be referred to as γ-alumina ($γ-Al_2O_3$).

Comparative Preparation Example 2

Ceria-alumina Support (Sintering Under Air Flow)

An alumina gel was prepared in the same manner as in Preparation Example 1, except for including 10 wt % of a cerium precursor ($Ce(NO_3)_3.6H_2O$) based on the weight of the aluminum precursor in the aluminum precursor solution. Then, a ceria-alumina support containing 10 wt % of cerium (Ce) was prepared in the same manner as in Comparative Preparation Example 1.

Comparative Preparation Example 3

Lanthana-alumina Support (Sintering Under Air Flow)

An alumina gel was prepared in the same manner as in Preparation Example 1, except for including 10 wt % of a lanthanum precursor (La(NO$_3$)$_3$.6H$_2$O) based on the weight of the aluminum precursor in the aluminum precursor solution. Then, a lanthana-alumina support containing 10 wt % of lanthanum (La) was prepared in the same manner as in Comparative Preparation Example 1.

Comparative Preparation Example 4

Silica-alumina Support (Sintering Under Nitrogen Flow)

An alumina gel was prepared in the same manner as in Preparation Example 1, except for including 10 wt % of a silicon precursor (Si(OC$_2$H$_5$)$_4$) based on the weight of the aluminum precursor in the aluminum precursor solution. Then, a silica-alumina support containing 10 wt % of silicon (Si) was prepared in the same manner as in Preparation Example 1.

Comparative Preparation Example 5

Silica-alumina Support (Sintering Under Air Flow)

An alumina gel was prepared in the same manner as in Preparation Example 1, except for including 10 wt % of a silicon precursor (Si(OC$_2$H$_5$)$_4$) based on the weight of the aluminum precursor in the aluminum precursor solution. Then, a silica-alumina support containing 10 wt % of silicon (Si) was prepared in the same manner as in Comparative Preparation Example 1.

FIG. 1 shows scanning electron microscopic (SEM) images of the alumina supports prepared in Preparation Example 1 (sintering under nitrogen flow) and Comparative Preparation Example 1 (sintering under air flow). Referring to FIG. 1, it can be seen that the supports prepared in Preparation Example 1 and Comparative Preparation Example 1 using the organic binder and the dispersing agent have pores formed uniformly in the support particles.

Figure 2:
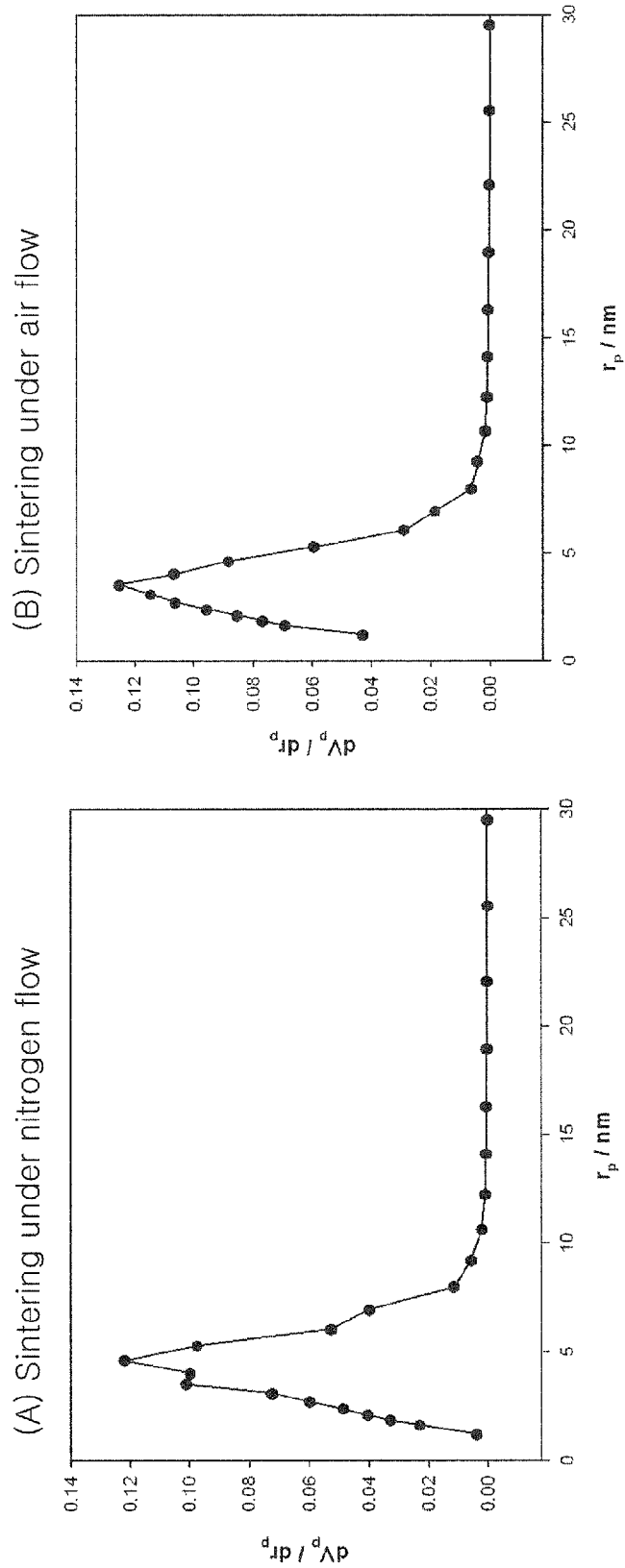
FIG. 2 shows a result of analyzing the pore characteristics of alumina supports prepared by sintering under nitrogen flow (Preparation Example 1) or sintering under air flow (Comparative Preparation Example 1) by the Barrett-Joyner-Halenda (BJH) method.

FIG. 2 shows a result of analyzing the pore characteristics of the alumina supports prepared in Preparation Example 1 (sintering under nitrogen flow) and Comparative Preparation Example 1 (sintering under air flow) by the Barrett-Joyner-Halenda (BJH) method. Referring to FIG. 2, it can be seen that the two supports wherein pore generation was induced through sol-gel transition using the PVA organic binder and the urea dispersing agent have similar pore characteristics.

Figure 3:
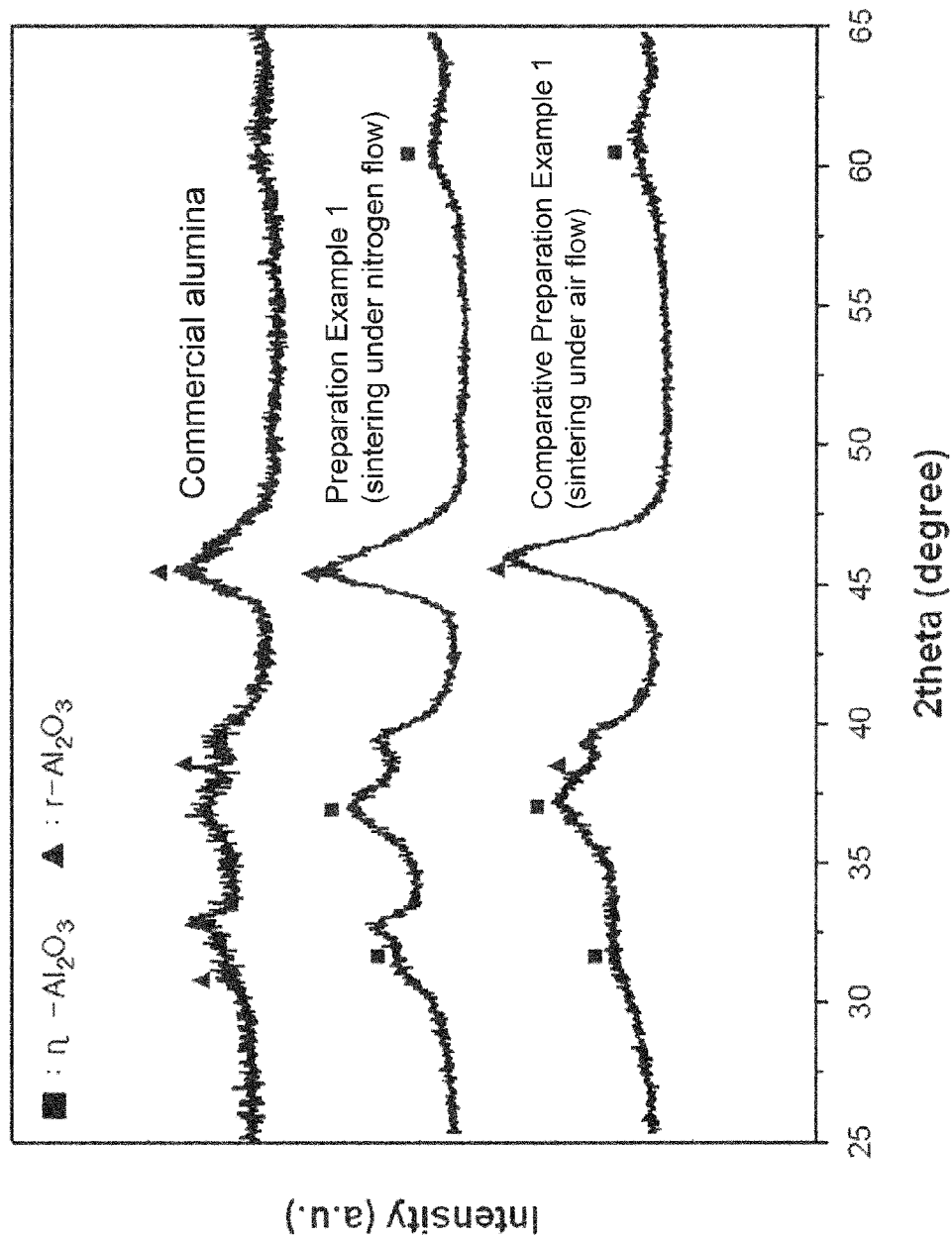
FIG. 3 shows a result of X-ray diffraction analysis of alumina supports prepared by sintering under nitrogen flow (Preparation Example 1) or sintering under air flow (Comparative Preparation Example 1) and a commercial alumina support.
Figure 4:
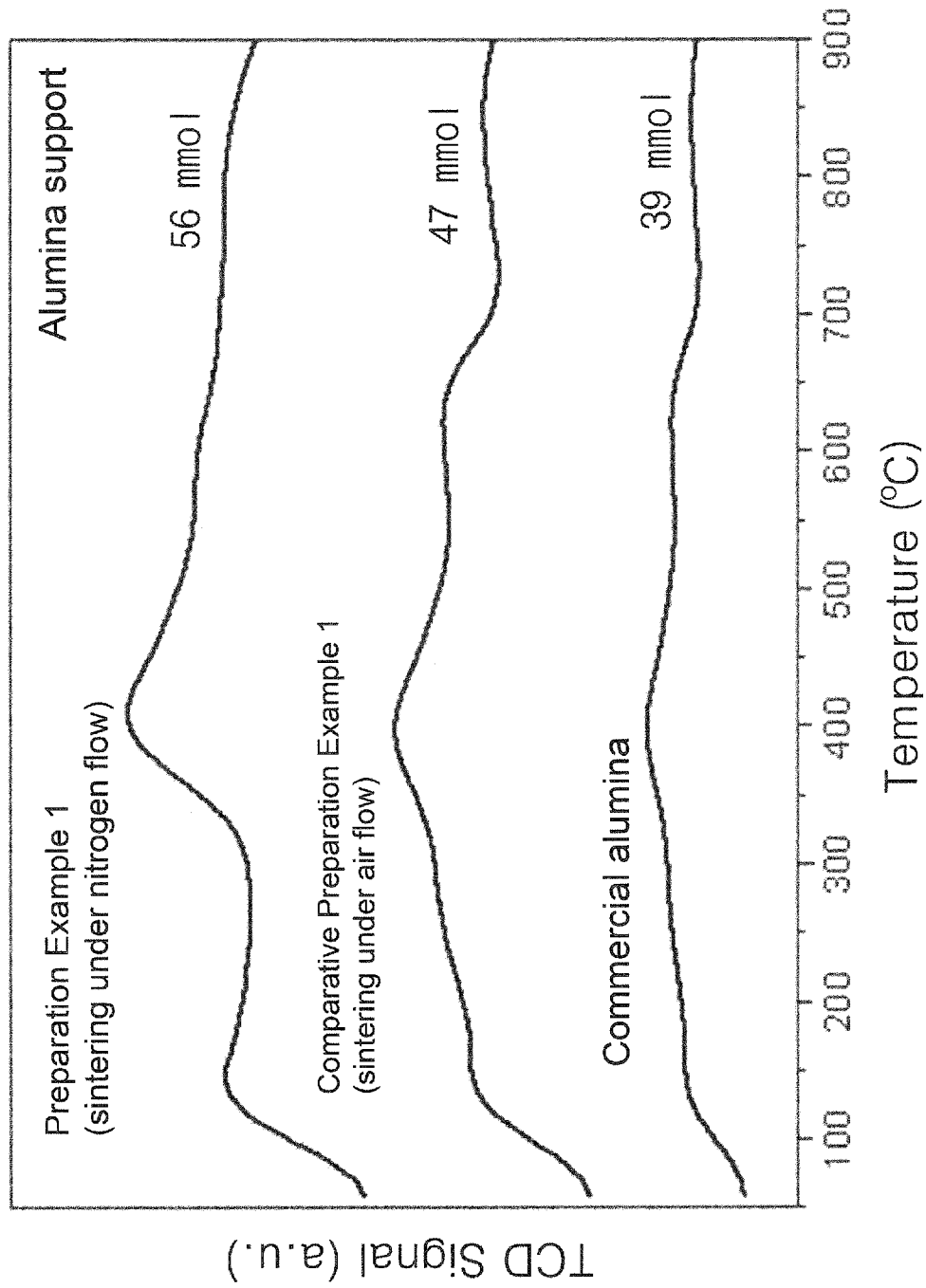
FIG. 4 shows a result of $NH_3$-TPD analysis to investigate the acid sites of alumina supports prepared by sintering under nitrogen flow (Preparation Example 1) or sintering under air flow (Comparative Preparation Example 1) and a commercial alumina support.

FIG. 3 and FIG. 4 respectively show results of comparing the crystal structure and acid sites of the alumina supports prepared in Preparation Example 1 (sintering under nitrogen flow) and Comparative Preparation Example 1 (sintering under air flow) and a commercial alumina support. The commercial alumina support is γ-alumina commercially available from Aldrich with the product name 521752 and was analyzed after removing impurities and moisture included in the alumina by sintering at 200° C. for 24 hours.

The X-ray diffraction analysis result shown in FIG. 3 reveals that the alumina supports prepared in Preparation Example 1 and Comparative Preparation Example 1 have different crystal structures. That is to say, although there was difference only in the sintering condition between Preparation Example 1 and Comparative Preparation Example 1, the support of Preparation Example 1 is relatively η-alumina rich, whereas the support of Comparative Preparation Example 1 is γ-alumina rich.

Referring to the NH$_3$-TPD analysis result shown in FIG. 4, the acid sites can be compared in three temperature ranges. The amount of weakly acid sites can be estimated at low temperatures around 200° C., whereas that of moderately acid sites and strongly acid sites can be estimated at moderate temperatures around 400° C. and high temperatures around 700° C., respectively. It can be seen that the alumina support of Preparation Example 1 has definitely more weakly acid sites and moderately acid sites than the other supports and also has significantly increased strongly acid sites. From the comparison of ammonia adsorption amount, it can be seen that the number of acid sites is in the order of Preparation Example 1>Comparative Preparation Example 1>commercial alumina. To conclude, it can be seen that the support of Preparation Example 1 is an η-alumina rich support and has more acid sites as compared to the support of Comparative Preparation Example 1 or the commercial alumina.

Figure 5:
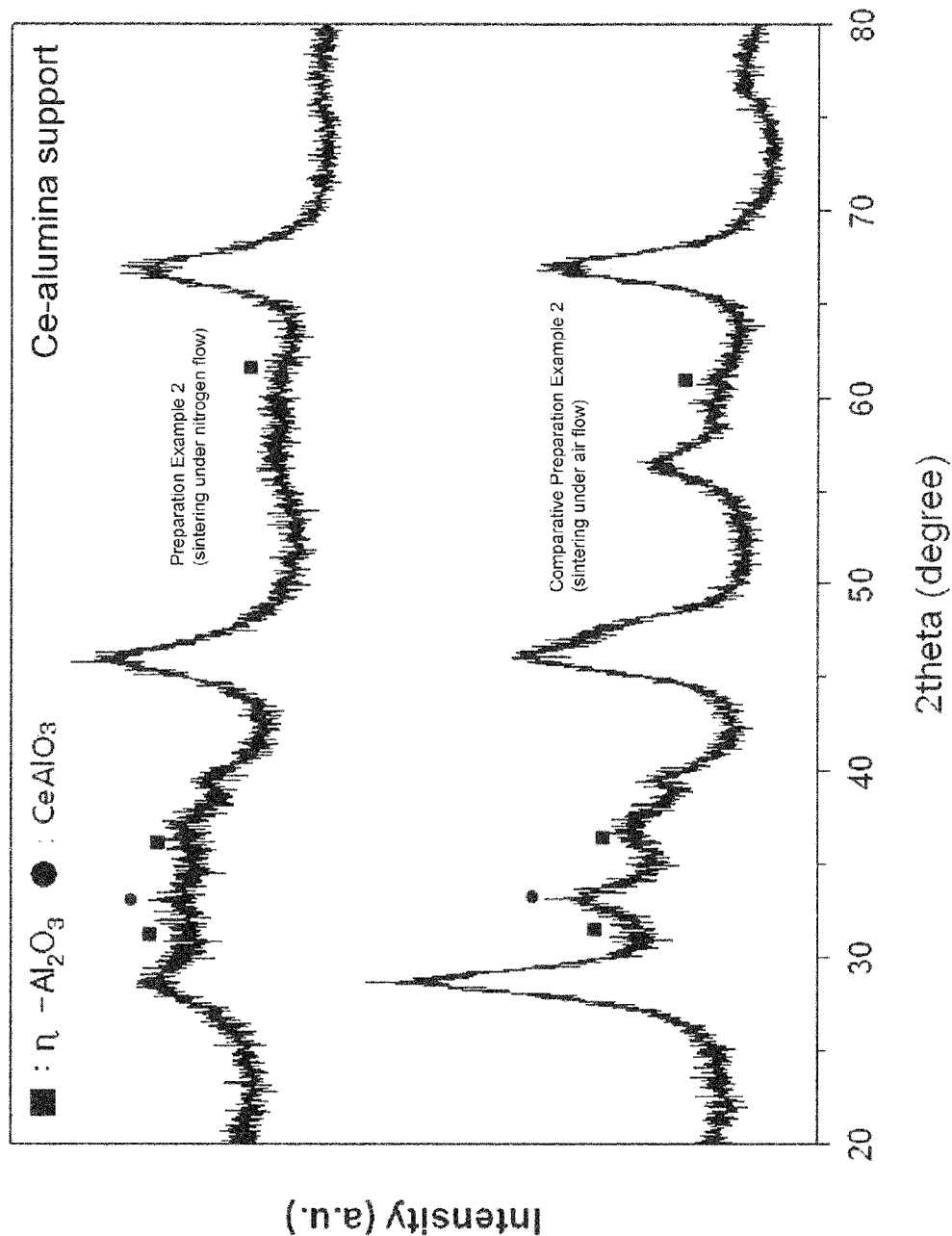
FIG. 5 shows a result of X-ray diffraction analysis of ceria-alumina supports prepared by sintering under nitrogen flow (Preparation Example 2) or sintering under air flow (Comparative Preparation Example 2)
Figure 6:
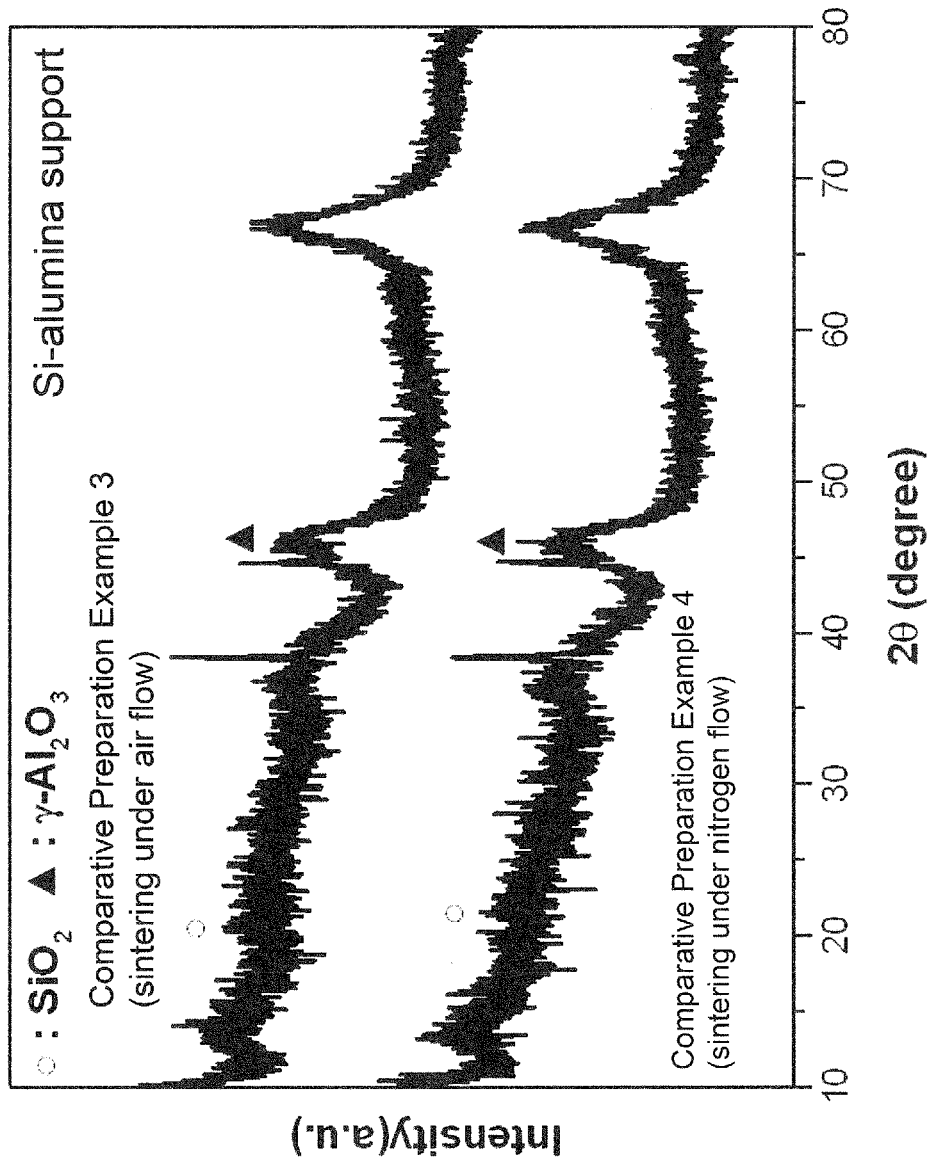
FIG. 6 shows a result of X-ray diffraction analysis of silicon (Si)-incorporated alumina supports prepared by sintering under air flow (Comparative Preparation Example 3) or sintering under nitrogen flow (Comparative Preparation Example 4)

Referring to the X-ray diffraction analysis shown in FIG. 5, it can be seen that the ceria-alumina support prepared by sintering under nitrogen flow (Preparation Example 2) has a crystal structure wherein η-alumina and ceria are relatively mixed well since the size of the ceria phase is decreased as compared to the ceria-alumina support prepared by sintering under air flow (Comparative Preparation Example 2). However, the Si-alumina supports further containing silicon (Si) (Comparative Preparation Examples 4-5) showed no change in crystal phase depending on the sintering condition (air or nitrogen atmosphere) and showed decreased pore size and volume, as can be seen from Table 1.

Table 1 shows a result of investigating the physisorption characteristics of the alumina supports prepared in Preparation Examples 1-3 and Comparative Preparation Examples 1-5 and a commercial alumina support.

TABLE 1

| | | N$_2$ physisorption | | |
|---|---|---|---|---|
| Alumina support | Sintering condition | Specific surface area (m$^2$/g) | Total pore volume (cm$^3$/g) | Average pore size (nm) |
| Preparation Example 1 (η-Al$_2$O$_3$) | Nitrogen | 172 | 0.44 | 10.3 |
| Preparation Example 2 (Ce-η-Al$_2$O$_3$) | Nitrogen | 169 | 0.36 | 8.7 |
| Preparation Example 3 (La-η-Al$_2$O$_3$) | Nitrogen | 183 | 0.37 | 8.2 |
| Comparative Preparation Example 1 (γ-Al$_2$O$_3$) | Air | 247 | 0.46 | 7.5 |
| Comparative Preparation Example 2 (Ce-γ-Al$_2$O$_3$) | Air | 206 | 0.33 | 6.5 |
| Comparative Preparation Example 3 (La-γ-Al$_2$O$_3$) | Air | 207 | 0.33 | 6.5 |
| Comparative Preparation Example 4 (Si-η-Al$_2$O$_3$) | Nitrogen | 306 | 0.20 | 3.2 |
| Comparative Preparation Example 5 (Si-γ-Al$_2$O$_3$) | Air | 259 | 0.27 | 3.6 |
| Commercial alumina | | 170 | 0.38 | 7.2 |

Examples

Preparation of Nickel Catalyst

Example 1

Preparation of 20Ni/η-alumina Catalyst (Repeated Impregnation and Drying)

The η-alumina prepared in Preparation Example 1 (2.5 g) was sintered at 200° C. for 24 hours to completely remove moisture included in the alumina. A nickel precursor solution was prepared by adding 20 wt % of nickel nitrate $(Ni(NO_3)_2 \cdot 6H_2O)$ based on the weight of the alumina support to distilled water corresponding to the pore volume of the alumina and stirring for 3 hours. After taking 0.1 mL of the nickel precursor solution and coating on the alumina support, the alumina support was dried in a vacuum oven at 60° C. for about 1 hour to completely dry the nickel precursor solution. The described procedure of impregnation and drying was repeated 15 times. Then, a 20Ni/η-alumina catalyst was prepared by drying the alumina support in a vacuum oven at 60° C. for 24 hours and then sintering at 800° C. under ambient pressure and air atmosphere for 8 hours.

Example 2

Preparation of 20Ni/Ce-η-alumina (Repeated Impregnation and Drying)

A 20Ni/Ce-η-alumina catalyst was prepared in the same manner as in Example 1, except for using the ceria-alumina support prepared in Preparation Example 2 (sintering under nitrogen flow).

Comparative Example 1

Preparation of 20Ni/γ-alumina Repeated Impregnation and Drying

A 20Ni/γ-alumina catalyst was prepared in the same manner as in Example 1, except for using the alumina support prepared in Comparative Preparation Example 1 (sintering under air flow).

Comparative Example 2

Preparation of 20Ni/Ce-γ-alumina (Repeated Impregnation and Drying)

A 20Ni/Ce-γ-alumina catalyst was prepared in the same manner as in Example 1, except for using the ceria-alumina support prepared in Comparative Preparation Example 2 (sintering under air flow).

Comparative Example 3

Preparation of 20Ni/Si-η-alumina (Repeated Impregnation and Drying)

A 20Ni/Si-η-alumina catalyst was prepared in the same manner as in Example 1, except for using the silica-alumina support prepared in Comparative Preparation Example 4 (sintering under nitrogen flow).

Comparative Example 4

Preparation of 20Ni/Si-γ-alumina (Repeated Impregnation and Drying)

A 20Ni/Si-γ-alumina catalyst was prepared in the same manner as in Example 1, except for using the silica-alumina support prepared in Comparative Preparation Example 5 (sintering under air flow).

Comparative Example 5

Preparation of 20Ni/η-alumina (Normal Impregnation)

A 20Ni/η-alumina catalyst wherein nickel is supported on an η-alumina support was prepared in the same manner as in Example 1, except for performing impregnation and drying only once.

Specifically, the η-alumina prepared in Preparation Example 1 (2.5 g) was sintered at 200° C. for 24 hours to completely remove moisture included in the alumina. A nickel precursor solution was prepared by adding 20 wt % of nickel nitrate $(Ni(NO_3)_2 \cdot 6H_2O)$ based on the weight of the alumina support to distilled water corresponding to 2-3 times the apparent volume of the support, such that the support was sufficiently immersed. The alumina support was immersed in the nickel precursor solution, dried in a vacuum oven at 60° C. for 24 hours. Then, a 20Ni/η-alumina catalyst was prepared by sintering the alumina support at 800° C. under ambient pressure and air atmosphere for 8 hours.

Table 2 shows the physisorption characteristics and particle size of the nickel-based catalysts prepared in Examples 1-3 and Comparative Examples 1-4.

TABLE 2

| | | XRD | | $N_2$ physisorption | | |
|---|---|---|---|---|---|---|
| Nickel-based catalysts | Supporting method | d (NiO) (nm) | d (Ni$^0$) (nm) | Specific surface area (m$^2$/g) | Total pore volume (cm$^3$/g) | Average pore size (nm) |
| Example 1 (20Ni/η-Al$_2$O$_3$) | Repeated impregnation and drying | 9.3 | 6.9 | 177 | 0.26 | 5.3 |
| Example 2 (20Ni/Ce-η-Al$_2$O$_3$) | Repeated impregnation and drying | 8.5 | 6.3 | 138 | 0.13 | 4.3 |
| Comparative Example 1 (20Ni/γ-Al$_2$O$_3$) | Repeated impregnation and drying | 12.3 | 9.2 | 105 | 0.22 | 8.1 |

TABLE 2-continued

| | | XRD | | N$_2$ physisorption | | |
| --- | --- | --- | --- | --- | --- | --- |
| Nickel-based catalysts | Supporting method | d (NiO) (nm) | d (Ni$^0$) (nm) | Specific surface area (m$^2$/g) | Total pore volume (cm$^3$/g) | Average pore size (nm) |
| Comparative Example 2 (20Ni/Ce-γ-Al$_2$O$_3$) | Repeated impregnation and drying | 10.3 | 7.7 | 101 | 0.19 | 6.6 |
| Comparative Example 3 (20Ni/Si-η-Al$_2$O$_3$) | Repeated impregnation and drying | 11.3 | 8.5 | 272 | 0.13 | 7.9 |
| Comparative Example 4 (20Ni/Si-γ-Al$_2$O$_3$) | Repeated impregnation and drying | 12.3 | 9.3 | 211 | 0.15 | 8.1 |
| Comparative Example 5 (20Ni/η-Al$_2$O$_3$) | Normal impregnation | 20.3 | 15.2 | 201 | 0.20 | 10.8 |

Figure 7:
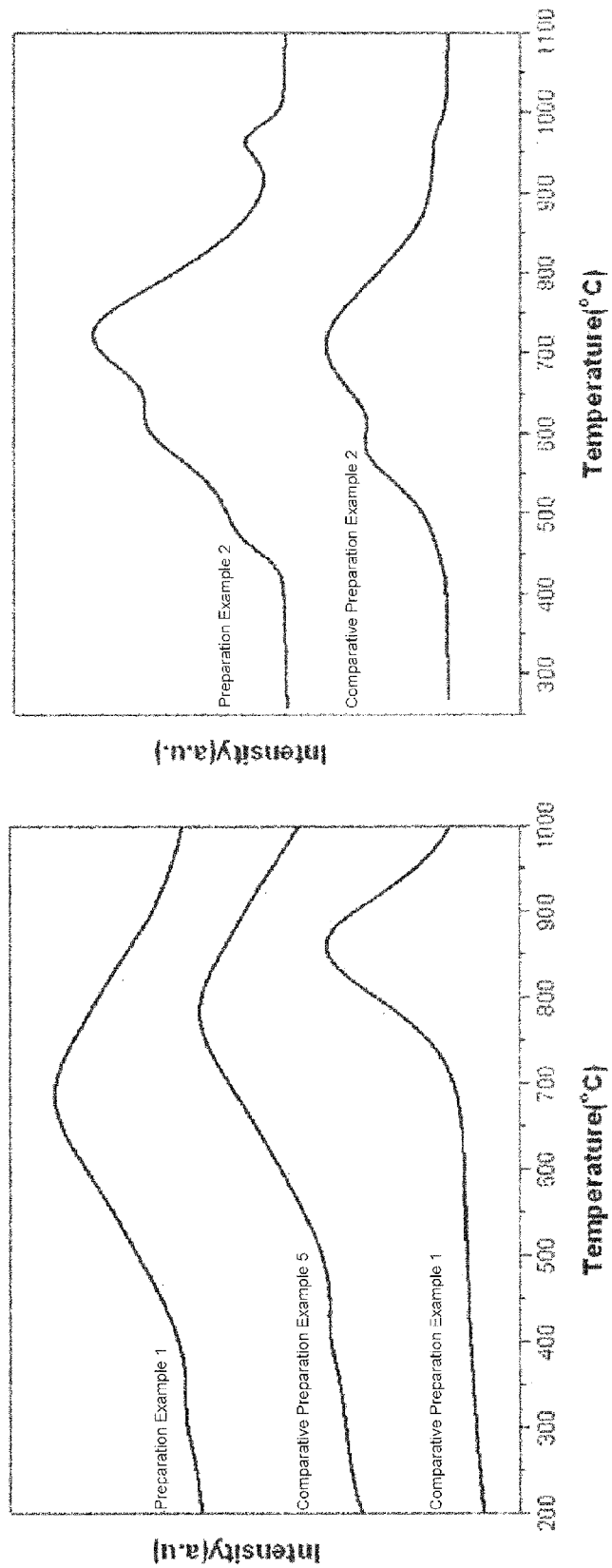
FIG. 7 shows a temperature-programmed reduction (TPR) analysis of nickel-supported alumina catalysts (Examples 1-2 and Comparative Examples 1, 2 and 5)

From the TPR analysis result shown in FIG. 7 and Table 2, the binding between the nickel active component and the alumina support can be estimated. The catalysts of Examples 1-2, which were prepared by supporting nickel on the η-alumina support prepared by sintering under nitrogen flow, show relatively decreased size of nickel oxide as compared to the catalysts of Comparative Examples 1-5 (prepared by supporting nickel on the support prepared by sintering under air flow). The decrease in the size of nickel oxide may be due to stronger binding between nickel and alumina. Also, the increased TPR peak area confirms that the reducibility of nickel is increased as a result of increased hydrogen spillover due to the presence of η-alumina having more acid sites. The Ni/η-Al$_2$O$_3$ catalyst of Comparative Example 5, which was prepared by supporting nickel by the normal impregnation method, shows significantly increased size of nickel oxide as compared to the catalyst of Example 1 (repeated impregnation and drying), which may be due to the decreased dispersibility of the active component. This can be confirmed from the comparison of pore size given in Table 2. The catalyst of Comparative Example 4 prepared by the normal impregnation method has increased average pore size as compared to the catalyst of Example 1 because of pore blocking.

Accordingly, it was confirmed that the catalyst prepared by supporting the nickel active component on the η-alumina support by repeating impregnation and drying tens of times according to the present invention has the active component uniformly dispersed on the support and exhibits strong binding between the alumina support and the nickel active component.

Test Example

Steam Carbon Dioxide Reforming of Methane Using Steam and Carbon Dioxide

In order to evaluate the activity of the catalyst, steam carbon dioxide reforming of methane was conducted using a specially designed high-pressure fixed-bed catalytic reactor.

Specifically, each of the nickel-based catalysts prepared in Examples 1-3 and Comparative Examples 1-4 was sieved through a sieve of 80-100 mesh and 0.5 g of the catalyst having a particle size of 150-250 μm was filled in the reactor. Then, reforming reaction was conducted after reducing under hydrogen (5 vol % H$_2$/N$_2$) at 800° C. for 3 hours. The reforming reaction was carried out sequentially at 850° C., 650° C. and 850° C. That is to say, the steam carbon dioxide reforming reaction was conducted at 850° C. for 10 hours, at 650° C. for 10 hours and then again at 850° C. for 10 hours, over a total of 30 hours. The reaction pressure was maintained at 1.0 MPa and the space velocity was maintained at 18000 L (CH$_4$)/kg cat/hr. The molar ratio of the react was fixed at CH$_4$:CO$_2$: H$_2$O=1:0.6:1.6. Among the reactants, gas was injected into the reactor using a mass flow controller and water was injected into the reactor after vaporizing to steam using an HPLC pump and an evaporator. Gas composition before and after the reaction was analyzed on-line using a gas chromatography system directly connected to the reactor. A Carbosphere column was used for separation of gas. The result of conducting steam carbon dioxide reforming of methane in the presence of the catalyst is summarized in Table 3.

TABLE 3

| | 850° C. (initial) | | | 850° C. (final) | | | Ni particle size after reaction |
| --- | --- | --- | --- | --- | --- | --- | --- |
| | Conversion rate (%) | | H$_2$/CO molar ratio | Conversion rate (%) | | H$_2$/CO molar ratio | |
| | CH$_4$ | CO$_2$ | | CH$_4$ | CO$_2$ | | |
| Example 1 (20Ni/η-Al$_2$O$_3$) | 94.0 | 40.2 | 2.01 | 89.7 | 32.0 | 1.95 | 18.7 |
| Example 2 (20Ni/Ce-η-Al$_2$O$_3$) | 93.7 | 39.8 | 2.02 | 86.5 | 36.6 | 2.05 | 16.2 |
| Comparative Example 1 (20Ni/γ-Al$_2$O$_3$) | 94.0 | 36.9 | 2.08 | 75.2 | 24.8 | 2.25 | 22.5 |
| Comparative Example 2 (20Ni/Ce-γ-Al$_2$O$_3$) | 94.5 | 38.2 | 2.03 | 74.1 | 28.7 | 2.27 | 32.9 |
| Comparative Example 3 (20Ni/Si-η-Al$_2$O$_3$) | 93.8 | 38.8 | 2.03 | 79.4 | 26.3 | 2.15 | 23.5 |
| Comparative Example 4 (20Ni/Si-γ-Al$_2$O$_3$) | 93.5 | 39.3 | 2.02 | 74.7 | 25.5 | 2.23 | 21.2 |
| Comparative Example 5 (20Ni/η-Al$_2$O$_3$) | 94.2 | 37.7 | 2.00 | 84.1 | 24.5 | 1.85 | 30.9 |

Conversion rate and H$_2$/CO molar ratio are average values for 5 hours after stabilization following steam carbon dioxide reforming at 850° C. (initial), 650° C. and 850° C. (final), for 10 hours each.

Referring to Table 3, when steam carbon dioxide reforming of methane was conducted using the nickel-based catalysts according to the present invention (Examples 1-2), the conversion rate of methane and carbon dioxide was high at 850° C. (initial), the H$_2$/CO molar ratio of the prepared synthesis gas was maintained at about 2±0.02 and neither pressure increase inside the reactor nor carbon deposition was observed during the steam carbon dioxide reforming reaction. Whereas deactivation of catalyst (carbon deposition or sintering) is usually observed when the temperature reaches 850° C. after reaction is performed at 650° C. for 10 hours, when steam carbon dioxide reforming of methane was conducted using the nickel-based catalysts according to the present invention (Examples 1-2), the conversion rate of methane and carbon dioxide decreased only slightly at 850° C. (final) by 5±2% as compared to the initial conversion rate and the $H_2/CO$ molar ratio of the synthesis gas was maintained at about 2±0.05. In particular, the catalyst of Example 2 prepared using the cerium (Ce)-incorporated ceria-alumina support (sintering under nitrogen flow) showed better durability.

In contrast, when steam carbon dioxide reforming of methane was conducted using the catalysts of Comparative Examples 1-5, the conversion rate of methane and carbon dioxide decreased significantly by 20±5% as compared to the initial conversion rate and the $H_2/CO$ molar ratio of the synthesis gas was maintained at 2±0.30. This result suggests that the catalysts of Comparative Examples 1-5 were deactivated after reaction was performed at 650° C. for 10 hours. Since the catalysts of Comparative Examples 1-5 use the η-alumina support having many acid sites, it seems that dehydrogenation of methane can occur by the active metal nickel.

The degree of deactivation of the catalyst can be evaluated by measuring the particle size of nickel since the size of the active metal nickel increases during steam carbon dioxide reforming due to carbon deposition or sintering by steam. Comparing the nickel particle size measure after the steam carbon dioxide reforming reaction given in Table 3, it can be seen that the catalysts of Examples 1-2 is much smaller in size than the catalysts of Comparative Examples 1-5. Accordingly, it can be seen that the nickel-based catalyst according to the present invention exhibits remarkably decreased deactivation when used for steam carbon dioxide reforming.

Figure 8:
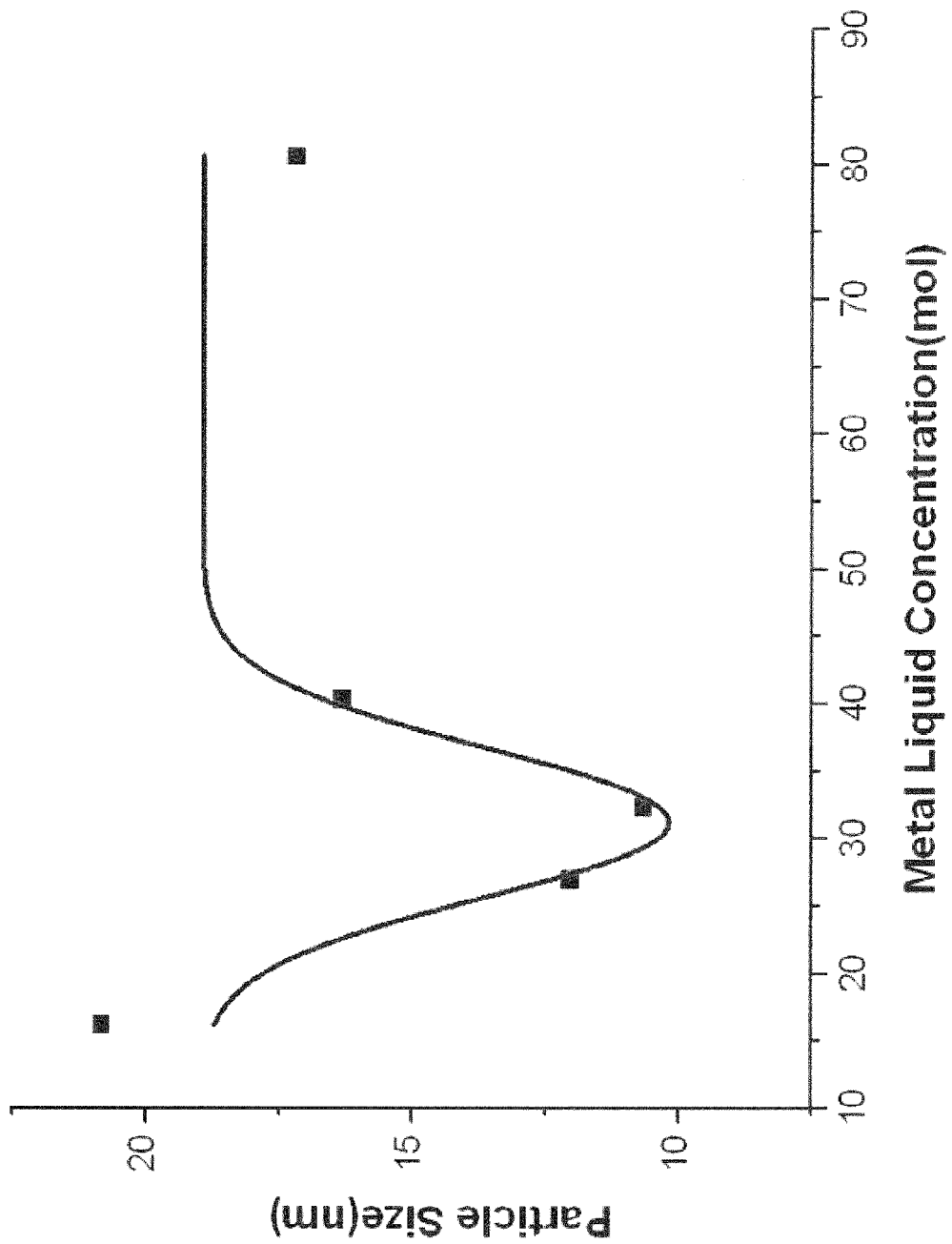
FIG. 8 shows the particle size of a prepared catalyst as a function of the concentration of a precursor solution.

FIG. 8 shows the effect of the supporting of the active component by repeated impregnation and drying according to the present invention. A 20 wt % $Ni/Al_2O_3$ catalyst was prepared in the same manner as in Example 1. To prepare the catalyst, a nickel precursor solution corresponding to a volume ratio of 1:0.25-2.5 based on the pore volume of the alumina support was prepared and the particle size of the prepared catalyst was measured. It can be seen that the catalyst prepared by repeated impregnation and drying according to the present invention has small particle size and increased dispersibility when the volume ratio of the precursor solution to the pore volume is 1:1.

As described above, the nickel-based catalyst prepared according to the present invention can exhibit superior activity as well as thermal stability when used in steam carbon dioxide reforming reaction (SCR) of methane performed under harsh conditions of high temperature since the active metal nickel is highly dispersed on the alumina support with strong binding.

The nickel-based catalyst prepared according to the present invention allows saving of the catalyst preparation cost since superior catalytic activity can be achieved even when the supporting amount of the nickel active component is minimized.

The nickel-based catalyst prepared according to the present invention has the nickel active component uniformly dispersed on the η-alumina support having many acid sites and exhibits superior durability.

Accordingly, the nickel-based catalyst prepared according to the present invention can exhibit superior catalytic activity when used in steam carbon dioxide reforming reaction (SCR) of methane using a mixture gas of steam and carbon dioxide not only at ambient pressure but also at high pressure of 20-80 bar.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A method for preparing a nickel-based catalyst for steam carbon dioxide reforming (SCR), comprising:
    preparing an alumina sol by adding an organic binder and a dispersing agent to an aluminum precursor solution and stirring at 50-90° C. at pH 3-6 and then converting the alumina sol to an alumina gel by heating at 50-90° C.;
    preparing an η-alumina support by drying the alumina gel at 150-230° C., shaping into a spherical shape and sintering under nitrogen flow; and
    preparing a nickel-based catalyst represented by Ni/η-alumina by supporting nickel on the η-alumina support by repeating a procedure of impregnating the η-alumina support in a nickel precursor solution and drying at 50-100° C. 10-20 times and then sintering under air flow.

2. The method for preparing a nickel-based catalyst for steam carbon dioxide reforming (SCR) according to claim 1, wherein the aluminum precursor solution further comprises a cerium (Ce) precursor, a lanthanum (La) precursor or a mixture thereof.

3. The method for preparing a nickel-based catalyst for steam carbon dioxide reforming (SCR) according to claim 2, wherein the cerium (Ce) precursor, the lanthanum (La) precursor or the mixture thereof is included in an amount of 5-15 wt % based on the weight of the aluminum precursor.

4. The method for preparing a nickel-based catalyst for steam carbon dioxide reforming (SCR) according to claim 1, wherein the organic binder is selected from a group consisting of polyvinyl alcohol, polyvinylpyrrolidone and polyvinylidene fluoride and the dispersing agent is selected from a group consisting of urea, melamine and polyisocyanate.

5. The method for preparing a nickel-based catalyst for steam carbon dioxide reforming (SCR) according to claim 1, wherein the organic binder and the dispersing agent are respectively used in an amount of 0.01-5 wt % based on the weight of the aluminum precursor.

6. The method for preparing a nickel-based catalyst for steam carbon dioxide reforming (SCR) according to claim 1, wherein the sintering in said preparing the η-alumina support comprises heating the alumina gel under nitrogen flow at 120° C. for 1-5 hours, heating while raising temperature at a rate of 3-10° C./min from 120° C. to 500° C. and then heating at 500° C. for 1-5 hours.

7. The method for preparing a nickel-based catalyst for steam carbon dioxide reforming (SCR) according to claim 1, wherein the volume ratio of the nickel precursor solution to a pore volume of the η-alumina support is 1:0.5-1.0.

8. The method for preparing a nickel-based catalyst for steam carbon dioxide reforming (SCR) according to claim 1, wherein the sintering in said preparing the nickel-based catalyst comprises heating the η-alumina support under air flow at 500-900° C. for 5-10 hours.

* * * * *